(12) United States Patent
Gillett et al.

(10) Patent No.: US 11,685,515 B2
(45) Date of Patent: Jun. 27, 2023

(54) ACTIVE HORIZONTAL STABILIZER FOR HIGH SPEED ROTORCRAFT

(71) Applicant: Bell Textron Inc., Fort Worth, TX (US)

(72) Inventors: Luke Dafydd Gillett, Grapevine, TX (US); James Rigsby, Coppell, TX (US); Jeffrey Kirkman, Fort Worth, TX (US); Craig Lovell, Arlington, TX (US); Andrew Carter, Richland Hills, TX (US); Aaron Alexander Acee, Euless, TX (US)

(73) Assignee: Textron Innovations Inc., Providence, RI (US)

( * ) Notice: Subject to any disclaimer, the term of this patent is extended or adjusted under 35 U.S.C. 154(b) by 37 days.

(21) Appl. No.: 17/069,816

(22) Filed: Oct. 13, 2020

(65) Prior Publication Data

US 2021/0107625 A1 Apr. 15, 2021

Related U.S. Application Data

(60) Provisional application No. 62/914,381, filed on Oct. 11, 2019.

(51) Int. Cl.
*B64C 5/16* (2006.01)
*B64C 13/16* (2006.01)
(Continued)

(52) U.S. Cl.
CPC .............. *B64C 13/16* (2013.01); *B64C 5/02* (2013.01); *B64C 5/16* (2013.01); *B64C 27/06* (2013.01); *B64C 2027/8281* (2013.01)

(58) Field of Classification Search
CPC ...... B64C 5/10; B64C 5/16; B64C 2027/8272
See application file for complete search history.

(56) References Cited

U.S. PATENT DOCUMENTS 3,706,432 A * 12/1972 Accashian .............. B64C 27/82
244/221
6,123,291 A * 9/2000 Dequin ................... B64C 13/16
244/17.19

(Continued)

FOREIGN PATENT DOCUMENTS

EP 0007317 A2 * 1/1980
EP 2799331 A1 * 11/2014 ............. B64C 13/42
(Continued)

OTHER PUBLICATIONS

FAA Helicopter Instructor's Handbook, pp. 3-15 and 3-16 (2012) (Year: 2012).*

(Continued)

*Primary Examiner* — Timothy D Collins
*Assistant Examiner* — Justin Michael Heston
(74) *Attorney, Agent, or Firm* — Lightfoot & Alford PLLC (BHTI)

(57) ABSTRACT

A rotorcraft has a horizontal stabilizer movable about an axis of rotation and a horizontal stabilizer control system configured to control the horizontal stabilizer to at least one of move the rotorcraft into a minimum drag position, maintain the aircraft in a minimum drag position, efficiently achieve a maneuver, enter efficient autorotation, and maintain efficient autorotation.

18 Claims, 7 Drawing Sheets

(51) Int. Cl.
*B64C 5/02* (2006.01)
*B64C 27/06* (2006.01)
*B64C 27/82* (2006.01)

(56) References Cited

U.S. PATENT DOCUMENTS

| | | | | |
|---|---|---|---|---|
| 2007/0095970 A1* | 5/2007 | Richardson | ............. | B64C 27/18 |
| | | | | 244/7 A |
| 2014/0054411 A1* | 2/2014 | Connaulte | ............. | B64D 27/24 |
| | | | | 244/17.13 |
| 2014/0326825 A1* | 11/2014 | Grohmann | ............ | B64C 13/341 |
| | | | | 244/17.13 |
| 2016/0090176 A1* | 3/2016 | Eglin | ..................... | B64C 27/08 |
| | | | | 244/17.21 |

FOREIGN PATENT DOCUMENTS

| | | | | | | |
|---|---|---|---|---|---|---|
| EP | | 2899118 A1 | * | 7/2015 | ............... | B64C 5/16 |
| EP | | 3091413 A1 | * | 11/2016 | ............. | B64C 13/16 |
| FR | | 2591187 A1 | * | 6/1987 | | |

OTHER PUBLICATIONS

FAA Rotorcraft Flying Handbook, pp. 3-9 through 3-11 (2000) (Year: 2000).*
FAA Helicopter Instructor's Handbook, pp. 3-15 and 3-16 (Year: 2012).*
FAA Rotorcraft Flying Handbook, pp. 3-9 through 3-11 (Year: 2000).*

* cited by examiner

ACTIVE HORIZONTAL STABILIZER FOR HIGH SPEED ROTORCRAFT

CROSS-REFERENCE TO RELATED APPLICATIONS

This application claims priority to U.S. Provisional Patent Application No. 62/914,381, filed on 11 Oct. 2019 by Luke Gillett, et al., and titled "ACTIVE HORIZONTAL STABILIZER FOR HIGH SPEED ROTORCRAFT," the disclosure of which is incorporated by reference in its entirety.

STATEMENT REGARDING FEDERALLY SPONSORED RESEARCH OR DEVELOPMENT

Not applicable.

BACKGROUND

Some rotorcraft have utilized horizontal stabilizers. However, conventional rotorcraft have utilized horizontal stabilizers only for controlling trim. There remains a need for improved rotorcraft control.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
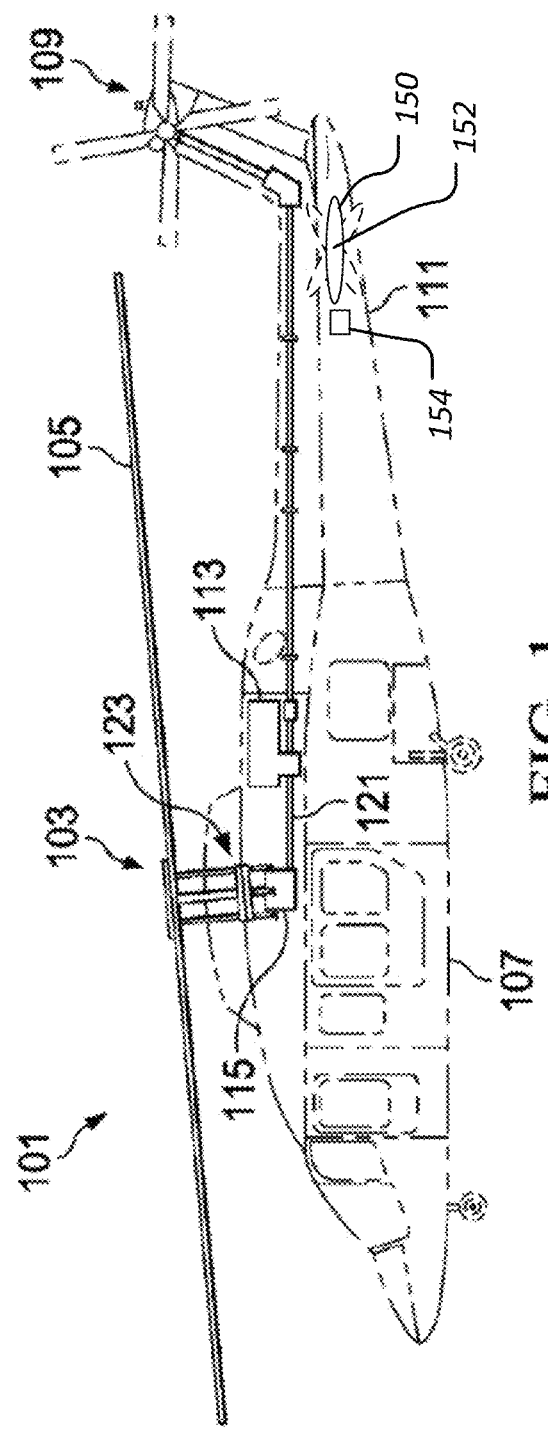
FIG. 1 is an oblique view of a rotorcraft according to this disclosure.

Referring now to FIG. 1 in the drawings, a rotorcraft 101 is illustrated. Rotorcraft 101 can include a rotor system 103 with a plurality of rotor blades 105. The pitch of each rotor blade 105 can be managed in order to selectively control direction, thrust, and lift of rotorcraft 101. For example, a swashplate mechanism 123 can be used to collectively and/or cyclically change the pitch of rotor blades 105. It should be appreciated that swashplate mechanism 123 is merely exemplary of one possible system for selectively controlling the pitch of rotor blades 105; for example, an independent blade control system is another exemplary system for selectively controlling the pitch of rotor blades 105. Rotorcraft 101 can include an airframe 107, anti-torque system 109, and an empennage 111. Torque can be supplied to rotor system 103 and anti-torque system 109 with at least one engine 113. A main rotor gearbox 115 is operably associated with an engine main output driveshaft 121 and the main rotor mast. Rotorcraft 101 is merely illustrative of the wide variety of aircraft and vehicles that are particularly well suited to take advantage of the method and system of the present disclosure. It should be appreciated that other aircraft can also utilize the method and system of the present disclosure.

Still referring to FIG. 1 the rotorcraft 101 further comprises actively controlled horizontal stabilizers 150 on each side of the rotorcraft 101. The horizontal stabilizers 150 are movable about a rotation axis 152 so that the leading edges of the horizontal stabilizers 150 can be angularly displaced about the rotation axis 152. Angularly offset positions of the horizontal stabilizers 150 are shown in dotted lines and are for illustration purposes only. Moving the horizontal stabilizers 150 about rotation axis 152 can selectively affect a spatial orientation of the rotorcraft 101 during fast forward flight (such as a pitch or angle of attack of the airframe 107), maintenance of a desired spatial orientation of the rotorcraft 101 in spite of transient environmental disturbances (such as maintaining pitch or angle of attack stability in response to wind conditions during fast forward flight), and generally support efficient maneuvering during fast forward flight (such as accomplishing maneuvers while maintaining a desired forward flight speed). In alternative embodiments, where a rotorcraft substantially similar to rotorcraft 101 further comprises wings, horizontal stabilizers 150 can be utilized during entry into emergency autorotation and maintenance of efficient autorotation by minimizing upward lift generated by the wings and maximizing airflow into the rotor system, as will be described in greater detail below.

Figure 2:
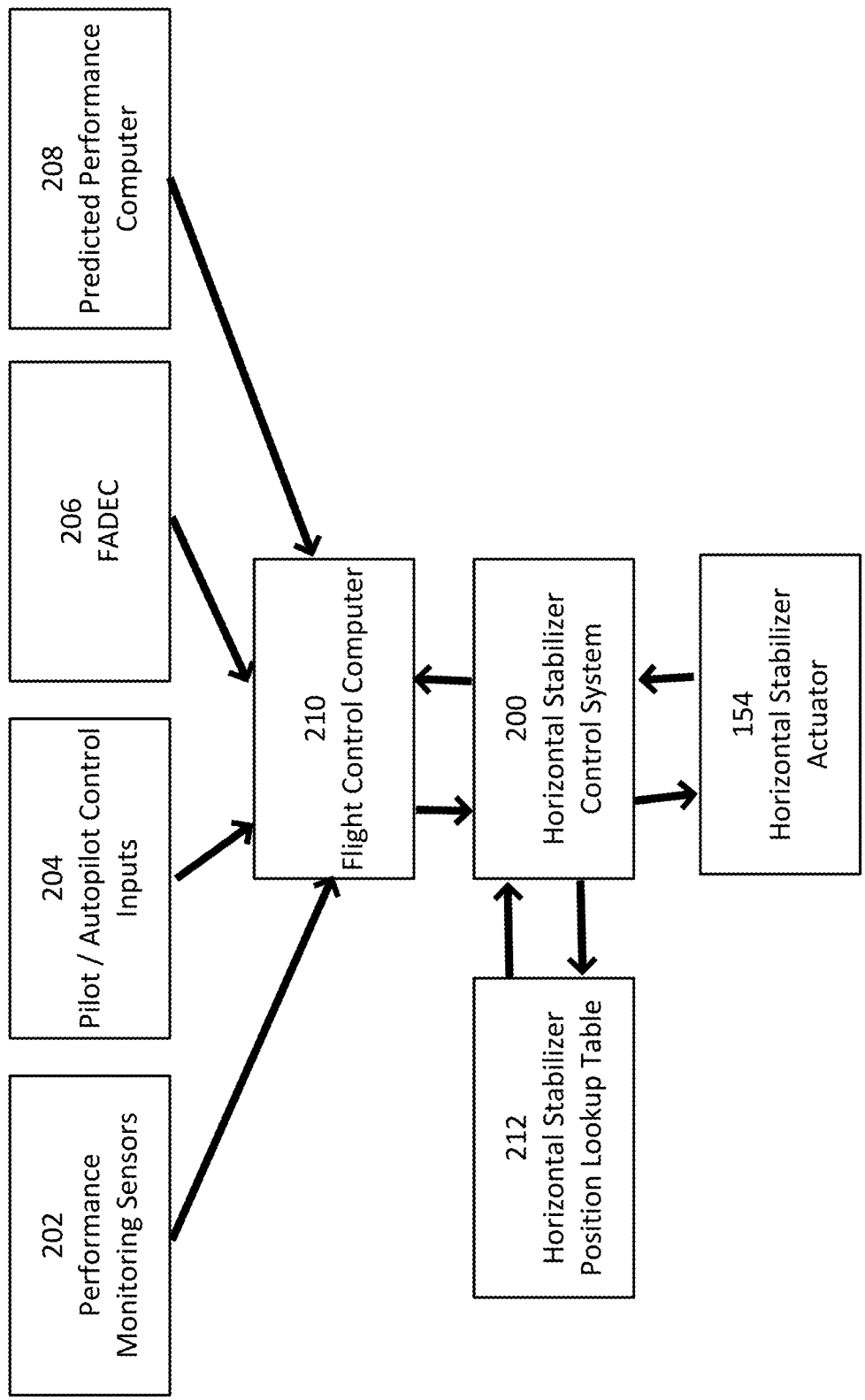
FIG. 2 is schematic view of a horizontal stabilizer control system of the rotorcraft of FIG. 1.

Referring now to FIG. 2, the rotorcraft 101 further comprises a horizontal stabilizer control system 200 configured to receive a variety of inputs, calculate desired horizontal stabilizer 150 angular positions, and output control signals to horizontal stabilizer actuators 154. A nonexhaustive list of input sources to the horizontal stabilizer control system 200 includes performance monitoring sensors 202 associated with measuring actual rotorcraft 101 performance, pilot and/or autopilot control inputs 204, full authority digital engine control (FADEC) 206 outputs indicative of engine status and/or performance, predicted performance computer 208 outputs, and flight control computer (FCC) 210 outputs. The horizontal stabilizer control system 200 can further obtain information from a horizontal stabilizer lookup table 212 that can comprise suggested horizontal stabilizer 150 position values suitable for achieving or maintaining an optimal airframe 107 trim and/or angle of attack for a given airspeed. Similarly, the horizontal stabilizer lookup table 212 can comprise suggested horizontal stabilizer 150 position values suitable for supporting efficient maneuvering of the rotorcraft 101. The horizontal stabilizer control system 200 is further configured to output control commands to one or more horizontal stabilizer actuators 154. In cases, the horizontal stabilizers 150 are independently controllable by multiple horizontal stabilizer actuators 154 such that the positions of the left and right horizontal stabilizers 150 can be different. Alternatively, the horizontal stabilizers 150 can be controlled to maintain substantially the same positions, in some cases using a single horizontal stabilizer actuator 154. In alternative embodiments, the horizontal stabilizer control system 200 and/or the horizontal stabilizer lookup table 212 can be provided as a portion of a flight control system.

Examples of performance monitoring sensors 202 include three axis linear and rotational accelerometers, airspeed measurement devices, weight sensors (for predetermining center of gravity), and any other sensors suitable for providing measured or calculated position, movement, and/or trajectory of the rotorcraft 101. Examples of pilot/autopilot control inputs 204 can include actual or simulated stick inputs for collective and cyclic control of the main rotor system and any other inputs generated by a pilot or computer to alter an orientation, speed, and/or trajectory of the rotorcraft 101. Examples of FADEC 206 outputs can include any engine performance parameters, such as RPM, engine efficiency, engine failure flags intended to trigger entry into an emergency autorotation descent, and/or any other suitable information that may be helpful in determining a desired control of a horizontal stabilizer 150. While information from performance monitoring sensors 202, pilot/autopilot control inputs 204, FADEC 206, and predicted performance computer 208 are all shown as flowing to the flight control computer 210, it will be appreciated that in some embodiments, the information from all sources of data can be made universally available to each of the predicted performance computer 208, flight control computer 210, and the horizontal stabilizer control system 200 and/or to any subset of the group.

Regardless of where the input data is sourced from, the horizontal stabilizer control system 200 is configured to augment control of the rotorcraft 101 in three primary ways. First, the horizontal stabilizer control system 200 is configured to achieve a minimum drag spatial orientation of the airframe 107 during fast forward flight. To achieve the minimum drag position, the horizontal stabilizer control system 200 can take into account at least the airspeed of the rotorcraft 101, a measured pitch attitude of the rotorcraft 101, and angle of attack of the aircraft 101, and altitude of the aircraft 101, and any other suitable information. In some cases, the above-described information can be utilized to query the horizontal stabilizer lookup table 212 to receive predetermined position values for the horizontal stabilizers 150. After receiving the predetermined position values for the horizontal stabilizers 150, the horizontal stabilizer control system 200 can control the horizontal stabilizer actuators 154 to rotate the horizontal stabilizers 150 to the received predetermined position values. Controlling horizontal stabilizers 150 in this manner can allow the rotorcraft 101 to achieve an optimized forward flight speed with an optimized fuel efficiency as a result of achieving a reduction in aerodynamic drag.

In some cases, while the rotorcraft 101 is operating in the above-described optimized fast forward flight, the rotorcraft 101 may encounter environmental or other disturbances that tend to destabilize the trim, pitch attitude, and/or angle of attack of the rotorcraft 101. Further, rotorcraft 101 may be more easily disturbed from an optimized fast forward flight orientation as the rotorcraft 101 airspeed increases. In response to a sensed deviation from an optimized fast forward flight orientation (such as by performance monitoring sensors 202) or in response to a predicted deviation from an optimized fast forward flight orientation (such as by predicted performance computer 208), the horizontal stabilizer control system 200 can alter the instructed positions of the horizontal stabilizers 153 and additive control process whereby the above-described desired minimum drag position of the horizontal stabilizers 150 are augmented by smaller but generally faster angular movements of the horizontal stabilizers 150 that can assist in maintaining the optimized fast forward flight orientation in spite of the transient disturbances. In some cases, the horizontal stabilizer control system 200 can change the instructed position of the horizontal stabilizers 150 at a rate of up to about 6-8 Hertz. In some embodiments, triplex actuators may be utilized to achieve the fast response and angular displacements. Some of the potential types of information that the horizontal stabilizer control system 200 can utilize to increase stability and/or maintain a desired orientation include, but is not limited to, a pitch rate of the airframe 107, the normal acceleration of the rotorcraft 101, a pitch attitude of the rotorcraft 101, and a collective input instead of or in addition to the angle of attack.

In some cases, the rotorcraft 101 may be caused by a pilot or autopilot to enter into a maneuver that is determined by the horizontal stabilizer control system 200 as overriding the importance of maintaining the above-described optimized minimum drag position. An example of such a maneuver includes severe lateral bank and/or a drastic pulling back or pushing forward on the control stick. When such a maneuver is identified by the horizontal stabilizer control system 200, priority is given to efficiently achieving the maneuver at hand as opposed to maintaining the minimum drag position. Accordingly, the horizontal stabilizer control system 200 is configured to query the horizontal stabilizer position lookup table 212 for horizontal stabilizer 150 angular positions that have been predetermined as suitable positions for more efficiently accomplishing the desired maneuver. In response to receiving the predetermined angular positions for the horizontal stabilizers 150 under the prescribed maneuver circumstances, the horizontal stabilizer control system 200 can output control signals to the horizontal stabilizer actuators 154 and thereby control the position of the horizontal stabilizers 150 to support the maneuver as opposed to supporting the minimum drag position. In some cases, the maneuver positions of the horizontal stabilizers 150 can further be additively augmented by taking into account the above-described dynamic stability indicators so that a desired maneuver can be made with minimal deviation in much the same manner as the minimum drag position can be maintained with minimal deviation. Some of the potential types of information that the horizontal stabilizer control computer 200 can utilize to support efficient maneuvering include, but is not limited to, a main rotor flapping value (to keep from exceeding a limit), pilot pitch command input, normal acceleration of the rotorcraft, a roll rate, a bank angle, and/or any other suitable information.

In some embodiments, the horizontal stabilizer control system 200 can determine when maneuvering is complete and/or when the rotorcraft 101 returns to fast forward flight and thereafter return priority of control over the horizontal stabilizers 150 from supporting the maneuver positions to supporting the minimum drag positions. In some cases, information regarding the forward airspeed and/or relatively level flight of the rotorcraft 101 are utilized as primary indicators of whether the rotorcraft 101 should once again utilize management of the horizontal stabilizers 150 to achieve a minimum drag position.

Figure 3:
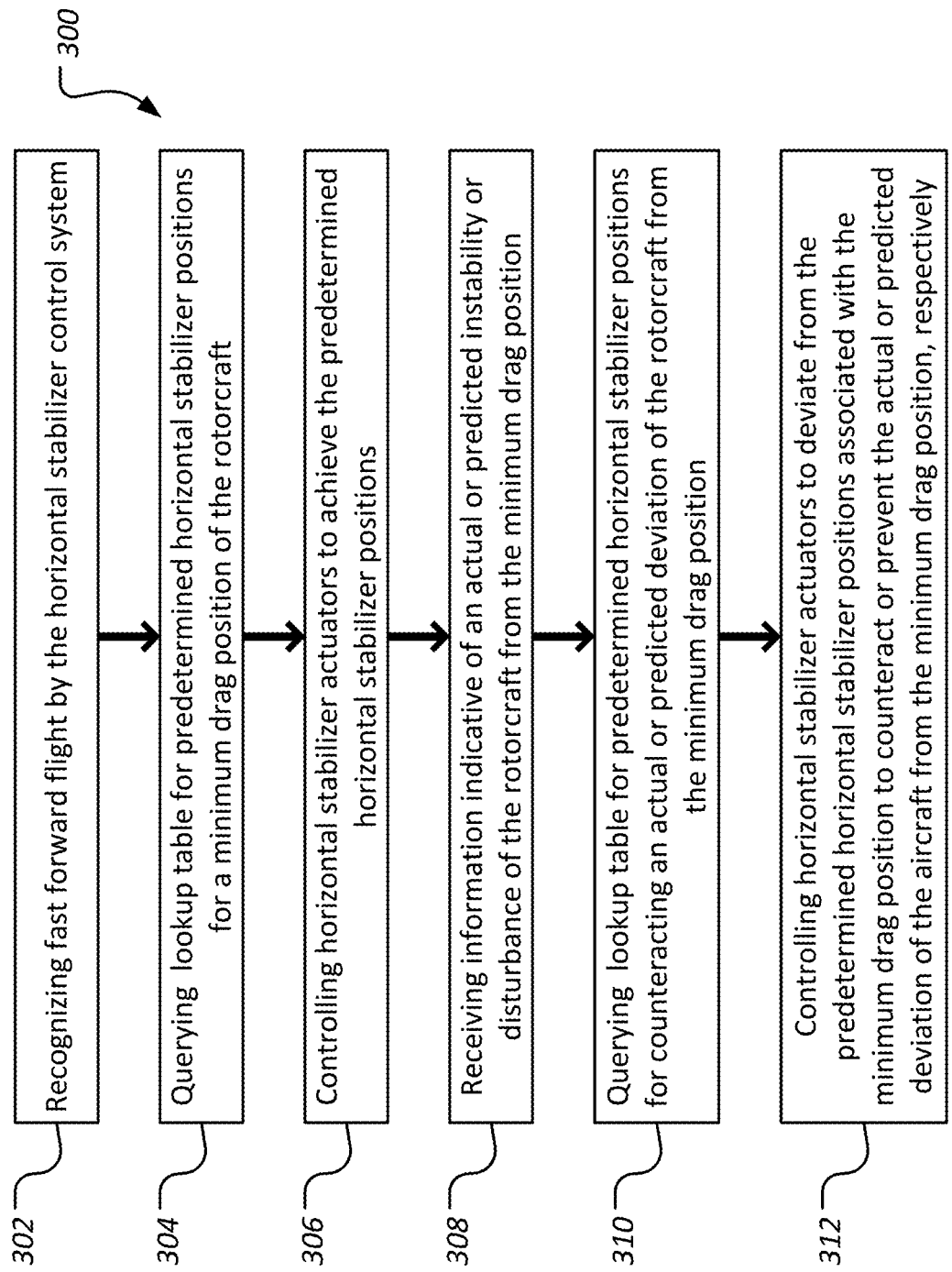
FIG. 3 is a flowchart of a method of controlling a horizontal stabilizer to achieve and maintain a minimum drag position of the rotorcraft of FIG. 1.

Referring now to FIG. 3, a flowchart of a method 300 of controlling a horizontal stabilizer to achieve and maintain a minimum drag position of a rotorcraft is shown. Method 300 can begin at block 302 by the horizontal stabilizer control system recognizing fast forward flight of the rotorcraft. Method 300 can continue at block 304 by querying a lookup table for predetermined horizontal stabilizer positions suitable for minimum drag positions of the rotorcraft. Next at block 306, method 300 can continue by controlling horizontal stabilizer actuators to achieve the predetermined horizontal stabilizer positions looked up at block 304. Method 300 can continue at block 308 by receiving information indicative of an actual or predicted instability or disturbance of the rotorcraft from the minimum drag position. At block 310, in response to the received information at block 308, the method can continue by querying a lookup table for predetermined horizontal stabilizer positions for counteracting an actual or predicted deviation of the rotorcraft from the minimum drag position. Further, at block 312, method 300 can continue by controlling horizontal stabilizer actuators to deviate from the predetermined horizontal stabilizer positions associated with the minimum drag positions to counteract or prevent the actual or predicted deviation of the aircraft from the minimum drag position, respectively.

Figure 4:
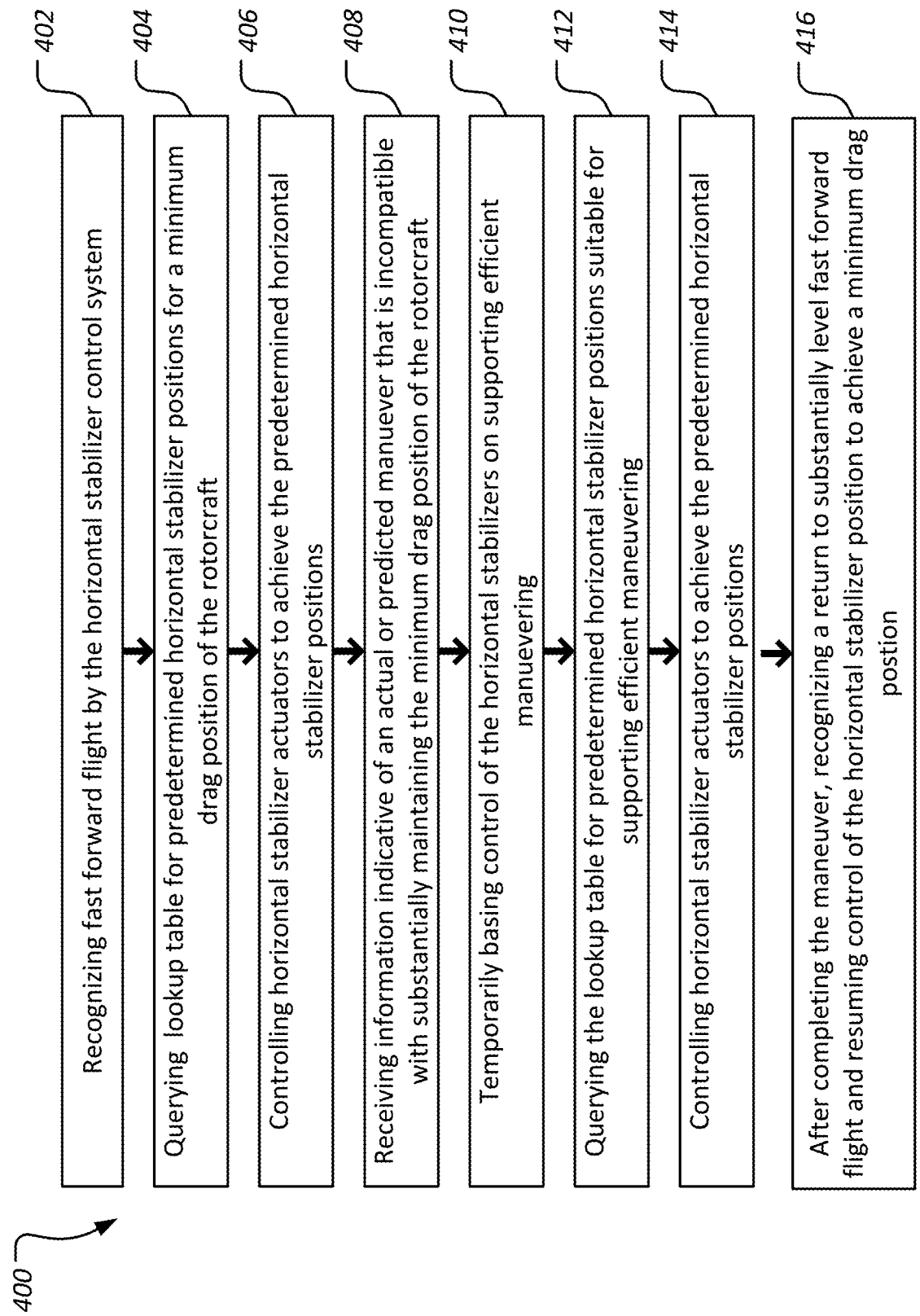
FIG. 4 is a flowchart of a method of controlling a horizontal stabilizer to achieve and maintain a minimum drag position of the rotorcraft of FIG. 1.

Referring now to FIG. 4, a flowchart of a method 400 of operating a horizontal stabilizer control system is shown. Method 400 can begin at block 402 by operating the horizontal stabilizer control system to recognize fast forward flight of a rotorcraft. Next, method 400 can progress at block 404 by querying a lookup table for predetermined horizontal stabilizer positions for a minimum drag position of the rotorcraft. At block 406, method 400 can progress by controlling horizontal stabilizer actuators to achieve the predetermined horizontal stabilizer positions. Next at block 408, the method can progress by receiving information indicative of an actual or predicted maneuver that is incompatible with substantially maintaining the minimum drag position of the rotorcraft. At block 410, the method can progress by temporarily basing control of the horizontal stabilizers on supporting efficient maneuvering. Next, at block 412, method 400 can progress by querying the lookup table for predetermined horizontal stabilizer positions suitable for supporting efficient maneuvering. Method 400 can progress at block 414 by controlling horizontal stabilizer actuators to achieve the predetermined horizontal stabilizer positions. Further, method 400 can progress at block 416 by, after completing the maneuver such as the efficient maneuver, recognizing a return to substantially level fast forward flight and resuming control of the horizontal stabilizer position to achieve a minimum drag position.

Figure 5:
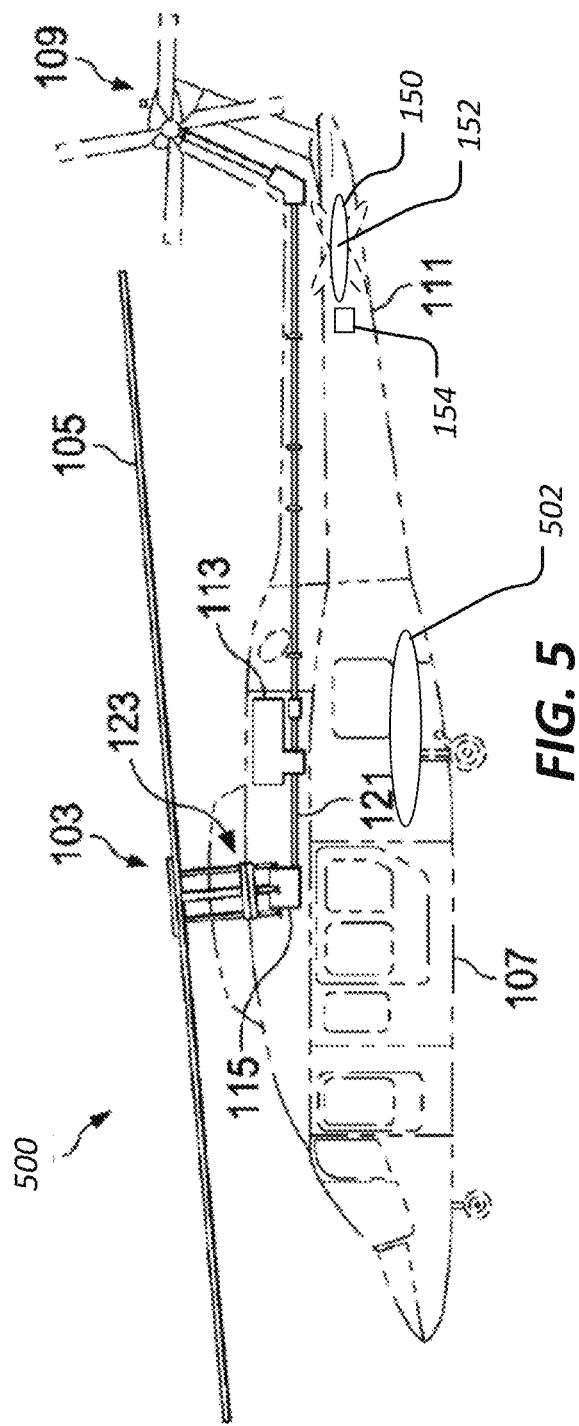
FIG. 5 is an oblique view of a rotorcraft according another embodiment of this disclosure.

Referring now to FIG. 5, a rotorcraft 500 is shown. Rotorcraft 500 is substantially similar to rotorcraft 101, but additionally comprises wings 502. Rotorcraft 500 is further configured to control the horizontal stabilizers 150 to minimize lift generated by the wings 502 when entering autorotation and to maintain minimum lift generated by the wings 502 during autorotation. In some cases, minimizing lift generated by the wings 502 comprises keeping the wings 502 at low angle of attack to direct more airflow energy to the main rotor. In this embodiment, when the horizontal stabilizer control system 200 receives an indication (such as a signal from FADEC 206 or FCC 210) that the engine(s) have failed and there exists a need for an autorotation descent, the horizontal stabilizer control system 200 can discontinue attempting to maintain a minimum drag position and begin controlling the horizontal stabilizers 150 to move the rotorcraft 101 into a position that reduces lift generated by wings 502 and increases an amount of airflow provided to the main rotor system 103. Systems and methods for determining an engine failure and signaling a need for autorotation can be found in U.S. Pat. No. 9,567,091 and are incorporated herein to the extent that supports the stated operation of this disclosure. In some embodiments, the rotorcraft 500 may, in response to determining a need for autorotation, reduce a collective pitch command such that a pitch of the main rotor blades is decreased so as to preserve the rotor speed of the rotor system. In some embodiments, rotor speed may be used as an input for maintaining and/or stabilizing orientation of the rotorcraft 500 once the rotorcraft 500 is in autorotation.

Figure 6:
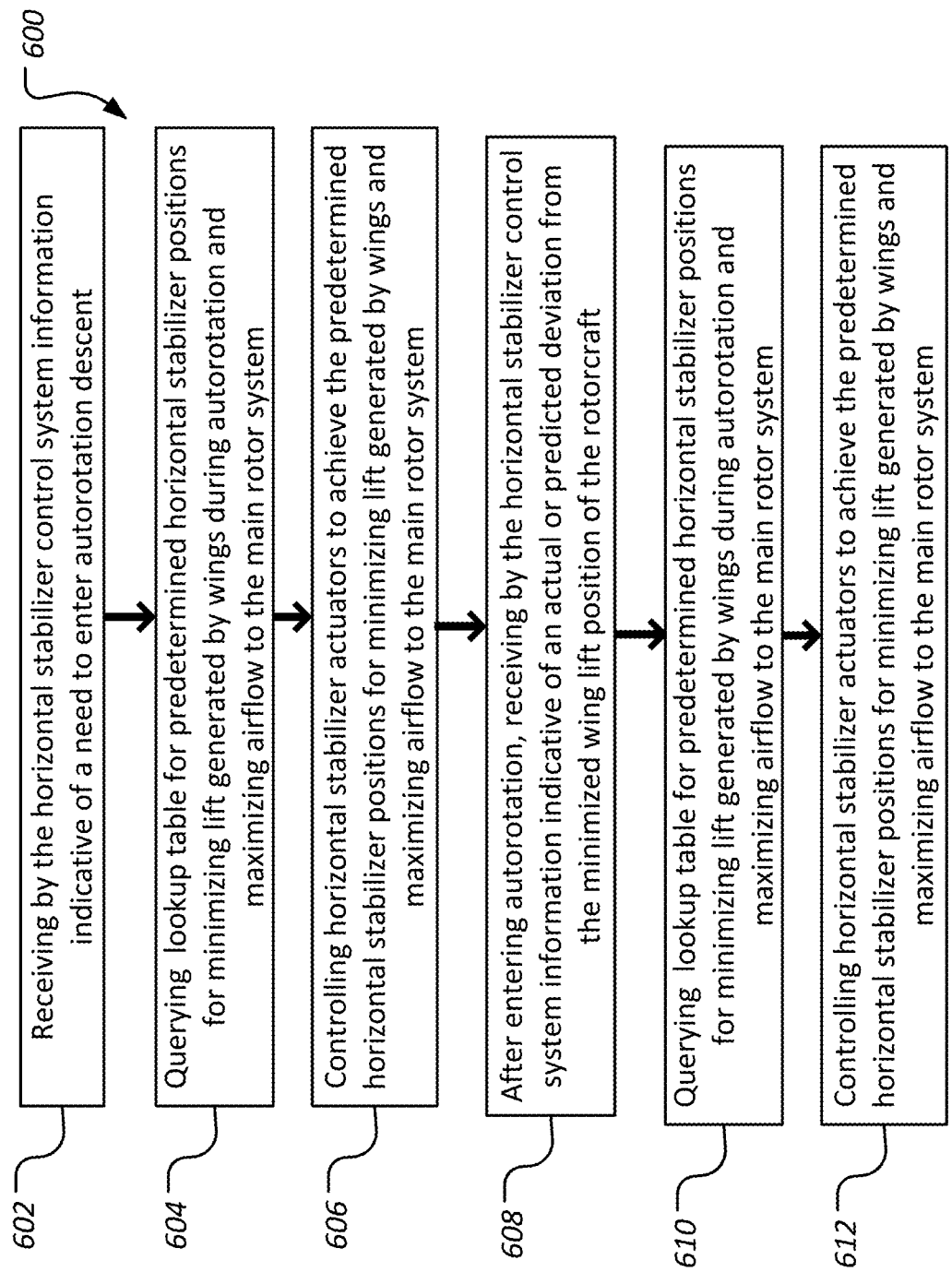
FIG. 6 is a flowchart of a method of controlling a horizontal stabilizer to achieve and maintain efficient autorotation of a rotorcraft such as the rotorcraft of FIG. 5.

Referring now to FIG. 6, a flowchart of a method 600 of controlling a horizontal stabilizer to achieve and maintain efficient autorotation is shown. Method 600 can begin at block 602 by operating the horizontal stabilizer control system to receive information indicative of a need to enter autorotation descent. Next, at block 604, method 600 can continue by querying a lookup table for predetermined horizontal stabilizer positions for minimizing lift generated by wings during autorotation and maximizing airflow to the main rotor system. At block 606, method 600 can continue by controlling horizontal stabilizer actuators to achieve the predetermined horizontal stabilizer positions for minimizing lift generated by wings and maximizing airflow to the main rotor system. Further, at block 608, method 600 can, after entering autorotation, operate the horizontal stabilizer control system to receive information indicative of an actual or predicted deviation from the minimized wing lift position of the rotorcraft. Next, at block 610, method 600 can continue by querying a lookup table for predetermined horizontal stabilizer positions for minimizing lift generated by wings during autorotation and maximizing airflow to the main rotor system. Method 600 can continue by, at block 612, controlling horizontal stabilizer actuators to achieve the predetermined horizontal stabilizer positions for minimizing lift generated by wings and maximizing airflow to the main rotor system.

Figure 7:
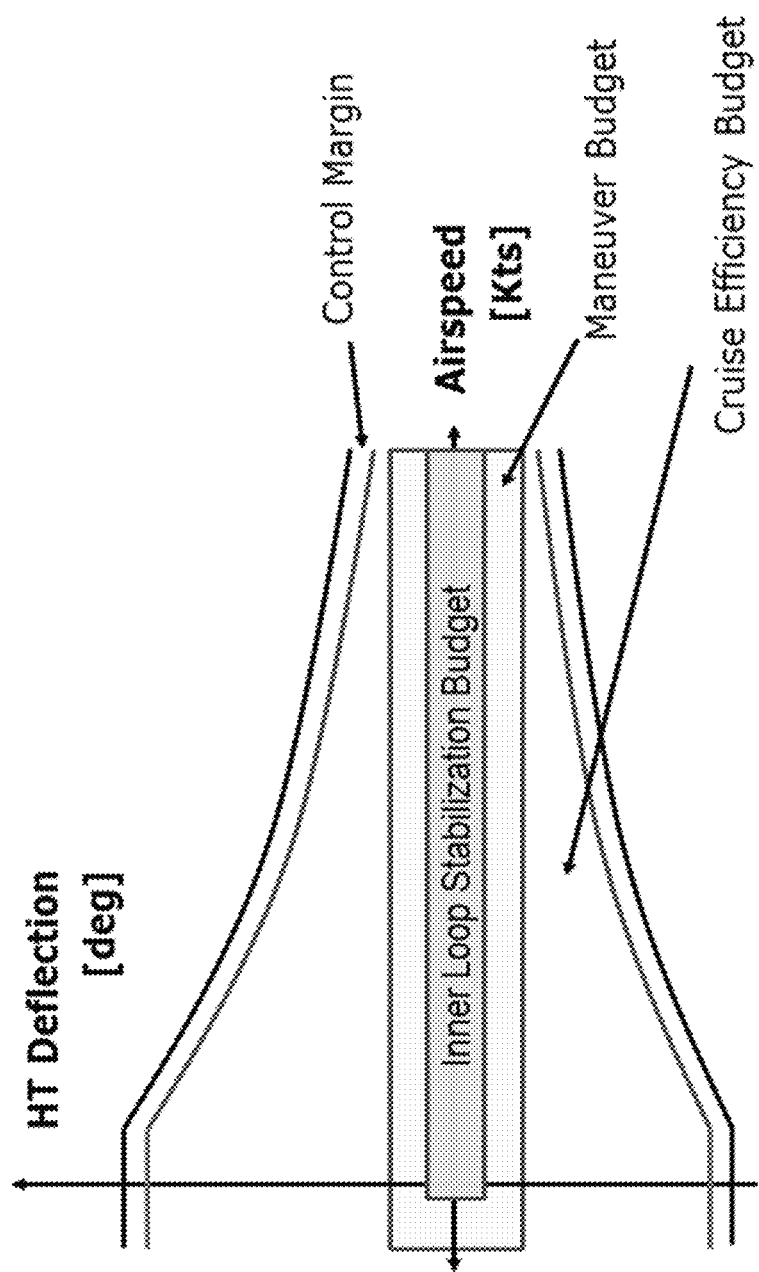
FIG. 7 is a chart of horizontal stabilizer angular deflection versus airspeed

Referring now to FIG. 7, a chart of horizontal stabilizer angular deflection versus airspeed is shown. The chart shows that as airspeed increases the allowed amount of angular deflection of the horizontal stabilizers 150 is reduced. The chart also shows a constant inner loop stabilization angular deflection budget and a constant maneuver angular deflection budget, which are both unaffected by changes in airspeed.

In some embodiments, a predetermined airspeed may serve as an entry threshold for activating use of the horizontal stabilizer control system 200 obtain and maintain a minimum drag position of the rotorcraft 101.

In some embodiments, an example maneuver may be an emergency nose up maneuver. In response to the emergency nose up maneuver, the horizontal stabilizers 150 may be controlled to move the leading edge down in an effort to aid the commanded pitch up maneuver and avoid main rotor control limits.

It is worth noting that controlling the overall pitch and/or angle of attack of the rotorcraft 101 may be accomplished faster by using the horizontal stabilizers as compared to the main rotor system.

It will be appreciated that the measured and/or monitored operational variables disclosed herein, such as, but not limited to, pitch attitude, can additionally be monitored for rates of change and any other suitable measurement of dynamic variation.

In some embodiments, a horizontal stabilizer position lookup table is constructed specific to a particular rotorcraft and/or a particular configuration or weight distribution of the rotorcraft cargo so that the lookup table is based around a particular center of gravity for the entire loaded rotorcraft. In some embodiments, multiple lookup tables may be provided that are associated with a same aircraft but different cargo loading configurations so that the horizontal stabilizer control system 200 may iteratively determine based on horizontal stabilizer 150 control effects, which of the lookup tables is best suited for use during a particular flight. In other words, some embodiments a horizontal stabilizer control system can utilize a variety of lookup tables associated with a variety of centers of gravity and ultimately utilize the best fit lookup table for the remainder of a flight. In alternative embodiments, were a lookup table is not provided or where lookup table is not providing satisfactory control results, inertial feedback may be utilized to augment values in a lookup table or replace using a traditional lookup table.

In some embodiments, the horizontal stabilizer control system 200 will actively command the horizontal stabilizers 150 to achieve all of the following simultaneously: steady state trim for cruise efficiency, maintain aircraft pitch stability margins, improve performance during dynamic maneuvers, retain aircraft pitch authority when cyclic rotor control is near/at its limit, and obtain optimal rotor inflow during high speed autorotation entry. The above described achievements can enable a rotorcraft to: safely obtain high forward speeds, maintain forward speed during aggressive maneuvers, minimize rotor droop during engine-out scenarios, and increase single engine Vne speeds.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotorcraft, comprising:
   a main rotor system;
   a tail boom;
   a tail rotor carried by the tail boom;
   a horizontal stabilizer carried by the tail boom, the horizontal stabilizer comprising a leading edge and the leading edge being movable about an axis of rotation relative to the tail boom; and
   a horizontal stabilizer control system configured to, in response to the rotorcraft entering autorotation, control the horizontal stabilizer to automatically and without pilot input maximize airflow to the main rotor without requiring a change in pitch of the main rotor system and without prioritizing maintaining a constant longitudinal attitude of the rotorcraft.

2. The rotorcraft of claim 1, wherein the horizontal stabilizer control system is configured to recognize forward flight of the rotorcraft.

3. The rotorcraft of claim 2, wherein the horizontal stabilizer control system is configured to query a lookup table for a predetermined horizontal stabilizer position for a minimum drag position of the rotorcraft.

4. The rotorcraft of claim 3, wherein the horizontal stabilizer control system is configured to control a horizontal stabilizer actuator to achieve the predetermined horizontal stabilizer position.

5. The rotorcraft of claim 4, wherein the horizontal stabilizer control system is configured to receive information indicative of an actual or predicted instability or disturbance of the rotorcraft from the minimum drag position.

6. The rotorcraft of claim 5, wherein the horizontal stabilizer control system is configured to query a lookup table for a predetermined horizontal stabilizer position for counteracting the actual or predicted deviation of the rotorcraft from the minimum drag position.

7. The rotorcraft of claim 6, wherein the horizontal stabilizer control system is configured to control a horizontal stabilizer actuator to deviate from the predetermined horizontal stabilizer position associated with the minimum drag position to counteract or prevent the actual or predicted deviation of the rotorcraft from the minimum drag position, respectively.

8. The rotorcraft of claim 1, wherein the horizontal stabilizer control system is configured to control a horizontal stabilizer to provide a minimum drag position of the rotorcraft.

9. The rotorcraft of claim 8, wherein the horizontal stabilizer control system is configured to temporarily base control of the horizontal stabilizer position on supporting efficient maneuvering rather than minimum drag.

10. The rotorcraft of claim 9, wherein the horizontal stabilizer control system is configured to return control of the horizontal stabilizer position to support a minimum drag position of the rotorcraft instead of efficient maneuvering of the rotorcraft.

11. The rotor craft of claim 10, wherein the horizontal stabilizer control system is configured to recognize a return to substantially level fast forward flight.

12. The rotorcraft of claim 11, wherein the horizontal stabilizer control system is configured to resume controlling the horizontal stabilizer position to achieve a minimum drag position of the rotorcraft.

13. The rotorcraft of claim 1, wherein the horizontal stabilizer control system is configured to receive information indicative of a need to enter an autorotation descent.

14. The rotorcraft of claim 13, further comprising:
a plurality of wings;
  wherein the horizontal stabilizer control system is configured to query a lookup table for a predetermined horizontal stabilizer position for minimizing lift generated by the plurality of wings of the rotorcraft during autorotation and maximizing airflow to a main rotor system of the rotorcraft.

15. The rotorcraft of claim 14, wherein the horizontal stabilizer control system is configured to control a horizontal stabilizer actuator to achieve the predetermined horizontal stabilizer position for minimizing lift generated by the wings and maximizing airflow to the main rotor system.

16. The rotorcraft of claim 15, wherein the horizontal stabilizer control system is configured to, after entering autorotation, receive information indicative of an actual or predicted deviation from the minimized wing lift position of the rotorcraft.

17. The rotorcraft of claim 16, wherein the horizontal stabilizer control system is configured to query a lookup table for a predetermined horizontal stabilizer position for minimizing lift generated by the wings during autorotation and maximizing airflow to the main rotor system.

18. The rotorcraft of claim 17, wherein the horizontal stabilizer control system is configured to control a horizontal stabilizer actuator to achieve the predetermined horizontal stabilizer position for minimizing lift generated by the wings and maximizing airflow to the main rotor system.

* * * * *